United States Patent
Jaramillo et al.

(10) Patent No.: US 8,255,322 B2
(45) Date of Patent: Aug. 28, 2012

(54) DUAL SOURCE BANK FLOAT

(75) Inventors: Kenneth Lee Jaramillo, Clover, SC (US); Douglas P Elliott, Kennedale, TX (US); James Alan Kramer, Jr., Clover, SC (US); Melvin Gregory Nixon, Clover, SC (US); James William Stark, III, Schenectady, NY (US)

(73) Assignee: Bank of America Corporation, Charlotte, NC (US)

( * ) Notice: Subject to any disclaimer, the term of this patent is extended or adjusted under 35 U.S.C. 154(b) by 512 days.

(21) Appl. No.: 12/345,276

(22) Filed: Dec. 29, 2008

(65) Prior Publication Data

US 2010/0169201 A1     Jul. 1, 2010

(51) Int. Cl.
    *G06Q 40/00*     (2012.01)
(52) U.S. Cl. .............................................. 705/39
(58) Field of Classification Search .................. None
    See application file for complete search history.

(56) References Cited

U.S. PATENT DOCUMENTS

| 5,093,787 | A  | * | 3/1992 | Simmons ........................ 705/33 |
| 7,512,564 | B1 | * | 3/2009 | Geer ............................... 705/45 |
| 2004/0181485 | A1 | * | 9/2004 | Finch et al. ...................... 705/45 |
| 2006/0118613 | A1 |   | 6/2006 | McMann et al. |
| 2006/0212391 | A1 |   | 9/2006 | Norman et al. |
| 2007/0244815 | A1 |   | 10/2007 | Hawkins et al. |
| 2007/0288382 | A1 |   | 12/2007 | Narayanan et al. |
| 2008/0040249 | A1 |   | 2/2008 | Re et al. |

OTHER PUBLICATIONS

Shah, Anwar. Local Public Financial Management. The World Bank. 2007. pp. 37-38.*
International Bureau, International Search Report, Jan. 14, 2010.

* cited by examiner

*Primary Examiner* — Jason M Borlinghaus
(74) *Attorney, Agent, or Firm* — Moore & Van Allen, PLLC; Ryan P. Harris

(57) ABSTRACT

Bank float is assigned using a dual source bank float system by first determining which of a plurality of checks will be processed via a paper route and which will be processed via an image route. For the checks that will be processed via the paper route, a set of rules will be determined. For the checks that will be processed via the image route, a different set of rules will be determined. A bank float is applied to the paper checks using the paper set of rules and bank float is assigned to the image checks using the image set of rules.

7 Claims, 4 Drawing Sheets

DUAL SOURCE BANK FLOAT

BACKGROUND

Today, banks process checks in various ways, including electronically or by using the paper form of the check. For example, banks are allowed to clear paper checks, electronic checks, checks via automated clearinghouse (ACH), etc. Because checks may be processed via various ways and paths, processing of the checks are sometimes inaccurate and/or inefficient. Thus, there is a need to process checks in a simplified, accurate and efficient manner.

SUMMARY

In accordance with an aspect of the present invention, a method for assigning bank float via a dual source is disclosed. The method includes determining which of checks will be processed via a paper route and which will be processed via an image route. For the checks that will be processed via the paper route, a set of rules will be determined and used in assigning bank float to these paper checks. For the checks that will be processed via the image route, a different set of rules will be determined and thus, used in assigning bank float to these image checks.

Other aspects and features of the present invention, as defined by the claims, will become apparent to those skilled in the art upon review of the following non-limited detailed description of the invention in conjunction with the accompanying figures.

DETAILED DESCRIPTION

Figure 1:
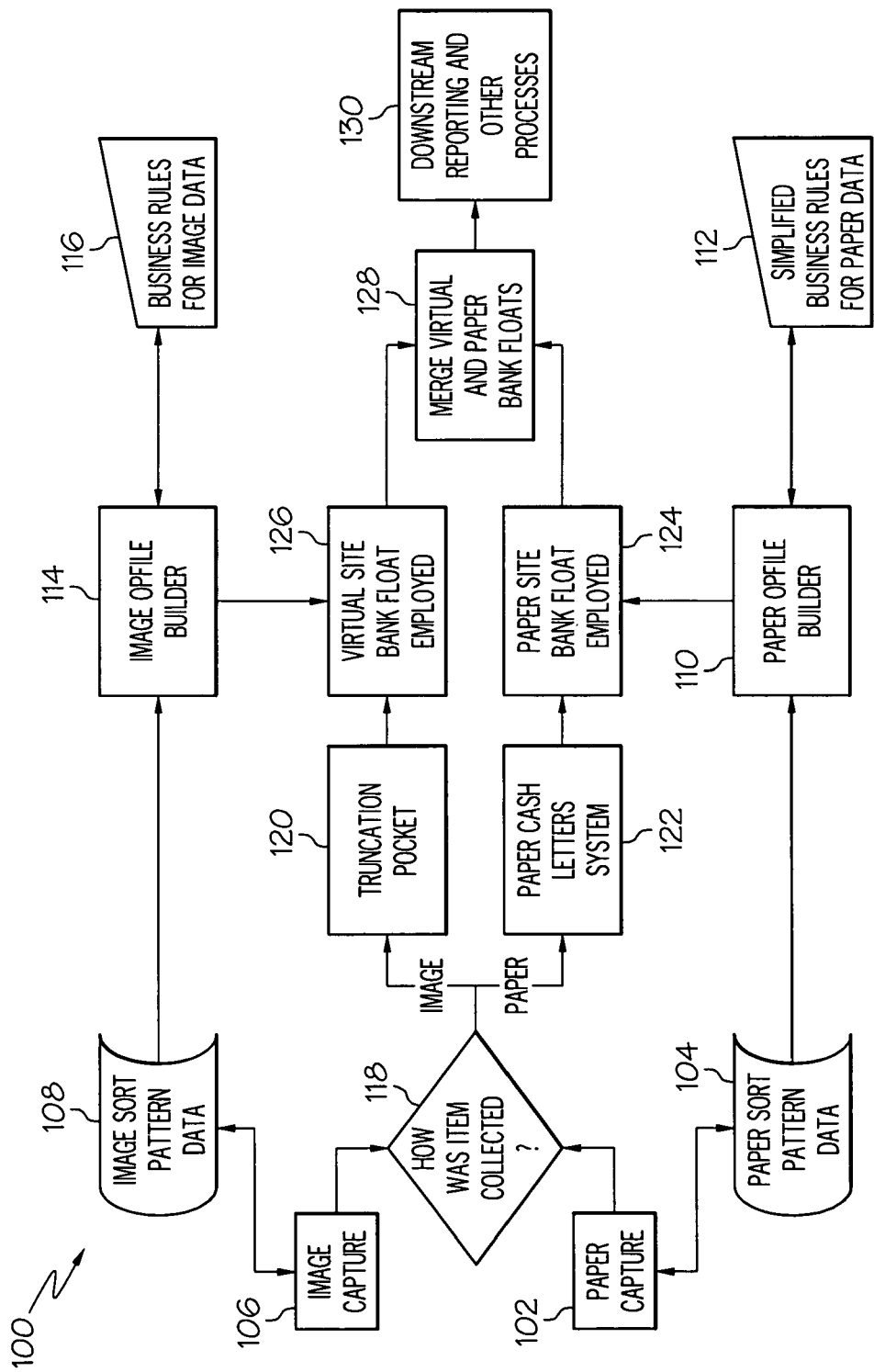
FIG. 1 is a flow chart of an exemplary system for dual source bank float in accordance with an embodiment of the present invention.

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operation area steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

It should be understood that terms like "bank," "financial institution," and just "institution" are used herein in their broadest sense. Institutions, organizations, or even individuals, that process loans are widely varied in their organization and structure. Terms like bank and financial institution are intended to encompass all such possibilities, including but not limited to, finance companies, stock brokerages, credit unions, mortgage companies, manufacturers who grant loans to secure the purchase of goods, finance companies, computer companies, etc. Additionally, disclosed embodiments may suggest or illustrate the use of agencies or contractors external to the financial institution to perform some of the calculations and data repository services. These illustrations are examples only, and an institution or business can implement the entire invention on their own computer systems or even a single work station if appropriate databases are present and can be accessed.

As illustrated in FIGS. 1-4, embodiments of the present invention are generally directed to methods, systems and computer program products directed to a dual source bank float. Generally, a check is a negotiable instrument instructing a financial institution to pay a specific amount of a specific currency from a specified demand account held in the maker/depositor's name with that institution. A check contains various information including, place of issue, check number, date of issue, payee, amount of currency, signature of the drawer, routing transit number (RT), account number, fractional routing number, etc. It is noted that the RT identifies which bank, and in which Federal Reserve district, the check is associated or directed to.

Check collection, or "check clearing", facilitates payment by moving checks from the banks where they are deposited (depository bank) to the bank on whose accounts they are drawn (paying bank), and then moving the payment in the opposite direction. This credits accounts at the depository bank and debits accounts at the paying bank. In processing a deposited check, the check may be converted into a check image or may remain a paper check. If the check is an image, this means the check is a digitized image of the original check, which may be electronically transmitted and processed. It includes front and back images of the original check, together with the check-writer's bank routing number, account number, and the dollar amount of the check in a magnetic ink character recognition (MICR) line along the bottom. As previously mentioned, checks may be processed and/or cleared via various paths, including paper clearing routes, image clearing routes, or automated clearing house (ACH). Generally, a check is cleared along with other checks waiting to be cleared and the group of checks being cleared together is known as a cash letter.

FIG. 1 illustrates an exemplary system of assigning bank float using a dual source in accordance with one embodiment of the present invention. Assigning bank float is one of the steps in the check clearing process. In the dual source bank float system of FIG. 1, the first step is to capture and sort the checks. At the point of capture, each check is assigned a "type" based on how it is to be sorted. Certain types of checks are designated for image clearing and others for paper clearing.

For checks that are designated for clearing via a paper route, these checks are first captured, as shown in block 102. Capture is defined as the electronic storage of the data contained on the MICR line of a check along with storage of the images of the front and the bank of the check. Capture of checks is accomplished on a sorting system. In one embodiment, the paper checks are taken to a sorting system, which sorts the checks according to which bank they are associated with or other predefined criteria. The sorting system is a machine which not only sorts the checks but also captures paper sort pattern data associated with each check, as shown in block 104. Eventually, the paper checks are grouped based on which bank or institution has been chosen as the clearing agent (usually the paying bank or an intermediary institution with access to the paying bank) and each cash letter is delivered to each respective bank or institution for presentment.

Alternatively, as shown in block 120, for checks that are designated for clearing via an imaging route, the checks are first captured as an image. Next, the paper versions of the imaged checks are placed into a truncation pocket and the paper versions of the checks are shredded after an appropriate retention period. The images of the checks are then electronically or virtually sorted according to which bank the check is associated with and/or other predefined criteria (e.g. RT, dollar amount, etc.). This process is performed by virtual sorting software, which also captures image sort pattern data, as shown in block 108. Eventually, the imaged checks are sent to each respective bank for presentment. However, prior to presentment a bank float is assigned to each check. According to embodiments of the present invention, a dual source bank float is employed where the floats are assigned to the paper checks via one process and assigned to the image checks via a separate process. Separating these two processes allows for the overall combined bank float for all checks to be accurate as opposed to a single bank float process being applied to all paper and image checks. Applying the dual source bank floats are further described below.

Embodiments of the present invention employ two operational float file ("opfile") builders. One opfile builder is for the paper data, as shown in block 110, and the other opfile builder is for the image data, as shown in block 114. Each opfile builder receives the sort pattern data and generates an opfile. Each opfile is a set of business rules that will be used in assigning bank float to the checks. The opfile is generated as a table, database, spreadsheet or any other format.

In block 110, the paper opfile builder receives the paper sort pattern data 104 and simplified business rules 112 and automatically generates a paper opfile. The paper opfile builder creates and sends the paper opfile to block 124 to assign a paper bank float to the checks which will be cleared via the paper route, as will be described in more detail later.

The simplified business rules 112 are rules which are manually inputted by the financial institution. The simplified business rules 112 define certain predefined rules to be used by the opfile builder in generating the opfile. The simplified business rules streamline the paper clearing process by minimizing steps and/or data required in processing. As an example, in the paper route, instead of using the 9 digit RT designation, a financial institution can use a 4 digit designation (called a "default") that every Federal Reserve district has. This 4 digit default RT provides enough information to assign float to a paper check, but minimizes the amount of data required for processing.

As previously mentioned, assigning bank float via the paper route is performed via a separate process from assigning bank float for the imaged checks. The process for assigning bank float to the image checks requires generation of an opfile specifically for image checks, called an "image opfile." As shown in block 114, an image opfile builder automatically generates the image opfile and uses the image opfile to assign bank float to each imaged check. The image opfile builder is separate from the paper opfile builder and the image opfile may have a completely different set of rules for applying bank float to the imaged checks as the paper opfile. In block 116, business rules may be manually entered by the financial institution to force certain business rules to be applied to the image opfile.

To apply a bank float to each check (whether image or paper), a determination is first made as to how each check was collected to determine whether or not the check is an image check or paper check, as shown in block 118. If the check is an image check, the imaged checks will be placed in a truncation pocket to be eventually shredded, as shown in block 120. However, if the check is a paper check, the check is placed in a pocket and noted on a cash letters system, as shown in block 122.

In blocks 124 and 126, the bank floats are applied to the checks using the opfiles or the set of rules generated by the opfile builders 110, 114, respectively. For example, in block 126, the imaged checks will be assigned a bank float based on the image opfile rules generated by the image opfile builder 114. Similarly, in block 124, the paper checks are assigned a bank float based on the paper opfile rules generated by the paper opfile builder 110.

After the paper checks are assigned paper bank floats and the image checks are assigned image bank floats, the image and paper bank floats are merged to create an overall bank float, as shown in block 128. Also, in block 130, the financial institution uses the dual-source bank floats for downstream reporting and other processes.

Figure 2:
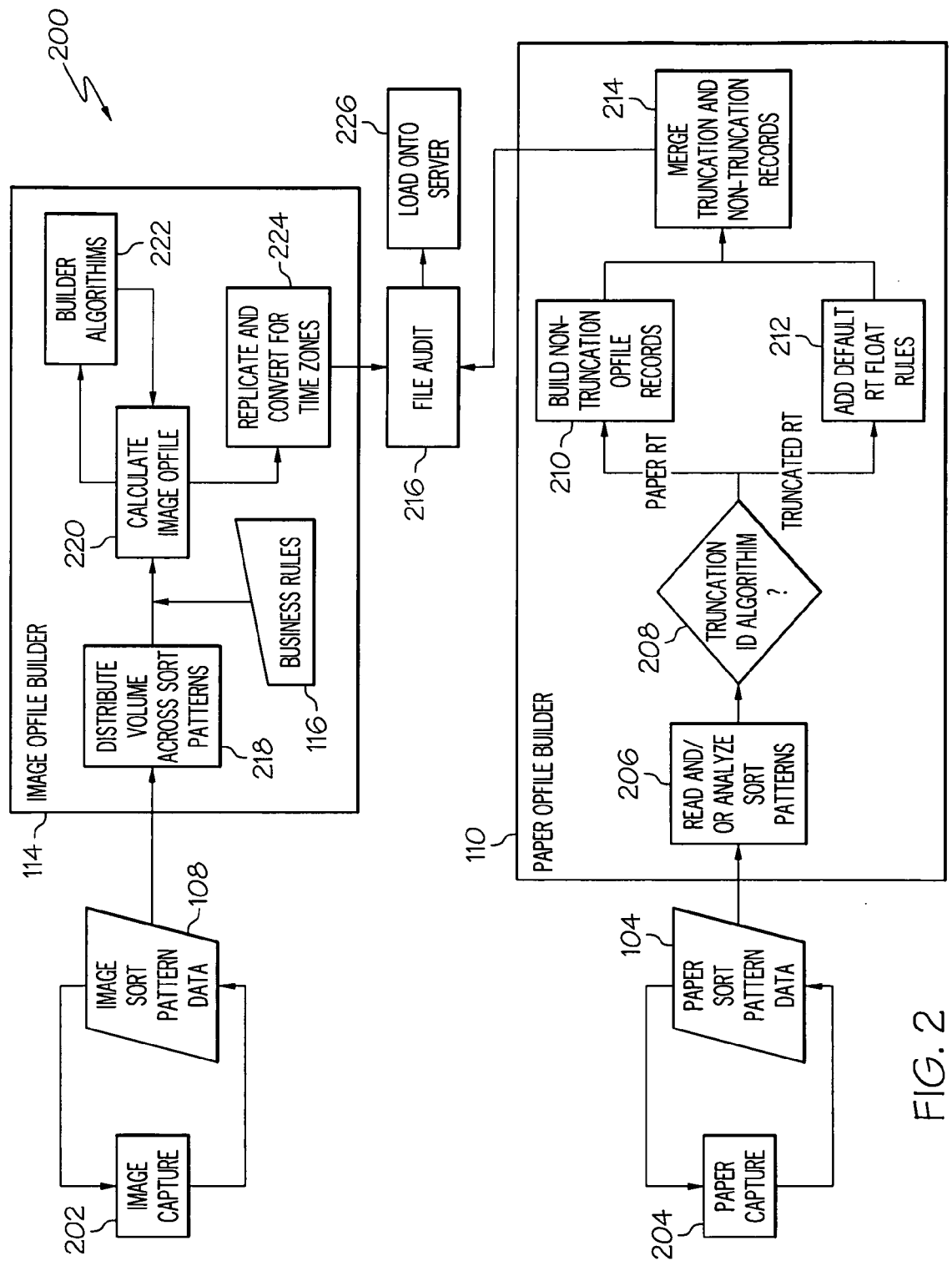
FIG. 2 is a flow chart of an example of the opfile builders of the dual source bank float in accordance with an embodiment of the present invention.

FIG. 2 illustrates the image opfile builder and the paper opfile builder according to one embodiment of the present invention. As previously mentioned, the paper sort pattern data 104 is received by the paper opfile builder 110 and the image sort pattern data 108 is received by the image opfile builder 110. The paper sort pattern data 104 is driven by the paper capture (e.g. sort pattern generator) of block 204, which is the paper sort pattern data software and/or machine. Similarly, the image sort pattern data 108 is driven by the image sort pattern capture 202, which is the image sort pattern data software and/or machine.

The paper opfile builder 110 receives, reads and analyzes the paper sort pattern data 104, as shown in block 206. During this process 206, the paper opfile builder 110 manipulates the paper sort pattern data 104 so that the data is usable, such as by eliminating extraneous data (e.g. credit pocketing information), keeping data that is needed and placing such data into an appropriate format.

In block 208, a determination is made as to whether or not to apply a truncation algorithm. The truncation algorithm 208 determines whether or not to build truncation or non-truncation opfile records. For example, the determination in block 208 may be set up to force all checks of a certain RT of $500 or more to have non-truncation opfile records built while all others have a default RT used. Another example may be that the determination in block 208 is set up to allow all checks deposited before 10 p.m. are going to be cleared via a truncated RT and all checks deposited on or after 10 p.m. are going to be cleared via a non-truncated RT. Thus, a set of rules are created and applied to block 208. Block 208 is described in more detail in FIG. 3.

For the checks that are determined to be cleared via the paper route, block 208 proceeds to block 210 where non-truncation opfile records are built for these checks. For the checks that are determined to be able to apply default RT float rules, block 208 proceeds to block 212 where default float rules are applied in building truncation opfile records. Thereafter, the truncation and non-truncation records are merged into one table in block 214. The merged truncation and non-truncation records are then sent to a file audit in block 216, which is discussed later.

Referring now to the image opfile builder process, the image opfile builder 114 receives image sort pattern data 108. At block 218, the image opfile builder 114 splits the data into multiple portions so the data can be processed separately. This step occurs so that a large amount of data can be processed at one time. In block 116, business rules are applied to set the data up for processing. For example, if an image sort pattern data needs to go out at 2 a.m., the business rules translates this time for the image opfile builder in order to ensure that processing is completed so that the image checks can go out on time at 2 a.m.

In block 220, the image opfile is calculated and placed in a table. Builder algorithms in block 222 sort the data in the image opfile as to various factors, such as RT, dollar amount, time of day, etc. In block 224, the image opfile is replicated and the times in the opfile are converted into the times of each respective time zone.

Prior to applying the opfile rules generated by the image opfile builder 114 and the paper opfile generator 110, the tables are sent to a file audit 216 to determine if the tables or rules will violate any software rules on a technical level. For example, the file audit 216 will make sure that certain numerical inputs will be numbers and not letters. This is essentially an error checking process.

The image opfile and paper opfile is then loaded onto a server at block 226. This server may be one server or a series of servers.

Figure 3:
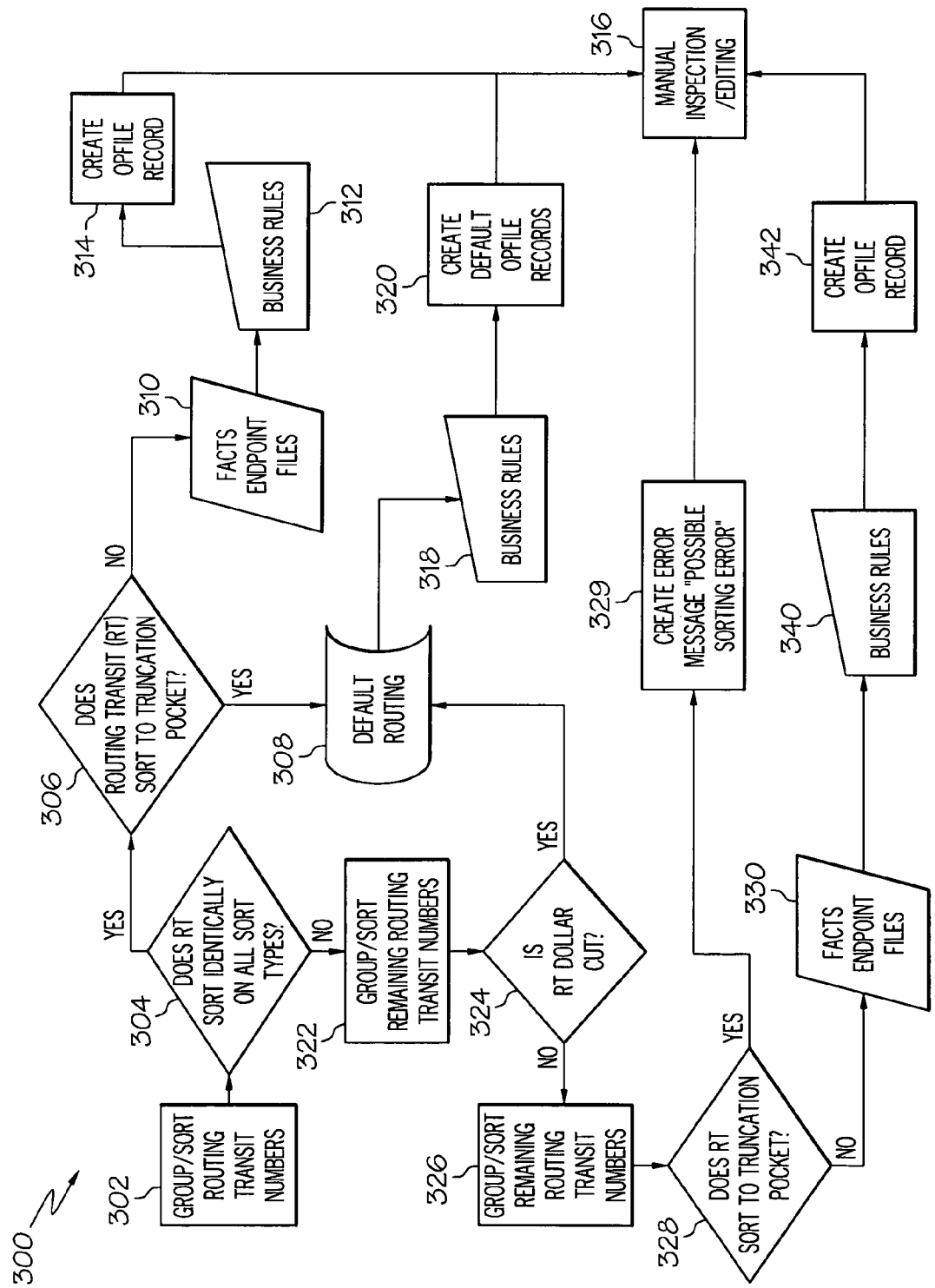
FIG. 3 is a flow chart of an example of the truncation algorithm of FIG. 2 and the dual source bank float system in accordance with an embodiment of the present invention.

FIG. 3 illustrates an embodiment of the truncation ID algorithm 208, as mentioned above, at 300. First, in block 302, the checks (or RTs) are grouped and sorted as to the RTs, as previously described. Next, in decision block 304, a determination is made as to whether any RTs are sorted identically all day long. In other words, decision block 304 determines if the checks having this specific RT are sorted the same all day. If so, processing of these checks proceeds to block 306 where a determination is made as to whether the check sorts to the truncation pocket to evaluate which checks will be cleared via the paper route and which checks are to be cleared via the image route. If the check sorts to a truncation pocket, then the check is deemed to be cleared via the image route and processing continues to block 308. Otherwise the check will be cleared via the paper route where processing continues to block 310.

In block 310, the checks are associated with Float Analysis Cashletter Tracking System (FACTS) endpoint files. FACTS is a software system that associates the checks with which bank the check will be drawn from. Endpoint files are the tables within the FACTS system containing bank specific information and information connecting the checks to these banks. The FACTS endpoint files are saved to the business rules in block 312. From the business rules 312, an opfile is created in block 314. This opfile is directed to the checks going the paper route and is sent for manual inspection/editing in block 316.

Referring back to block 306, if a determination is made that the check (or RT) does not sort to a truncation pocket, this indicates that the checks are sorted all day to the truncation pocket and processed via the image route. As such, the method 300 proceeds from block 306 to block 308 where the default RT number is used. As previously discussed the default RT number is the 4-digit federal district routing number and using the default RT number minimizing data processing as opposed to processing with the 9-digit RT number. After the default RT is employed in block 308, the default RTs are stored in the business rules 318 and default opfile records are created in block 320. The default opfile records will only be used for the checks which will be cleared via the image route and such opfile will be sent to block 316 for manual inspection and/or editing.

Referring back to block 304, if any RTs are not sorted identically on all sort types (i.e. for each RT, the checks of this RT are sorted differently at different times of the day), the remaining RTs (i.e. the RTs not sent to block 306) are then grouped and sorted.

In block 324, a determination is made as to whether the RT dollar amount of each check should be cut or processed differently based on a threshold amount. This threshold amount is manually set by the financial institution. For example, if a check's value is $150 and the financial institution has set the dollar cut threshold to be $100, then the check is cut because it meets the $100 threshold value. In any case, for an individual RT, where a cut or threshold determination must be made, processing of the check will proceed to block 308 and default rules will apply. The assumption made in doing this is that all items above the threshold are subject to image processing and that all items below the threshold are subject to paper processing. This assumption allows us to apply default routing for bank float of the paper items. In the case where and individual RT is not subject to a threshold or dollar cut, processing of the check will occur via the paper route starting with block 326.

In block 326, the remaining RTs are grouped and sorted and thereafter processing continues to block 328. In block 328, a determination is made as to whether the RTs are sorted to the truncation pocket or not. Any checks or RTs which reach decision block 328 should be processed via the paper route and thus, if any checks sort to the truncation pocket, an error has occurred and an error message is generated, as shown in block 329. Otherwise, if decision block 328 determines the RTs do not sort to the truncation pocket, the method 300 continues to block 330. Block 330 applies the FACTS software to receive endpoint files or tables that will be applied to the business rules at block 340 and thus, a paper opfile will be generated in block 342. The paper opfile is then manually inspected and/or edited. Any or all of the paper opfiles described above, including those created by blocks 314 and 342, are merged together at any time after creation.

Figure 4:
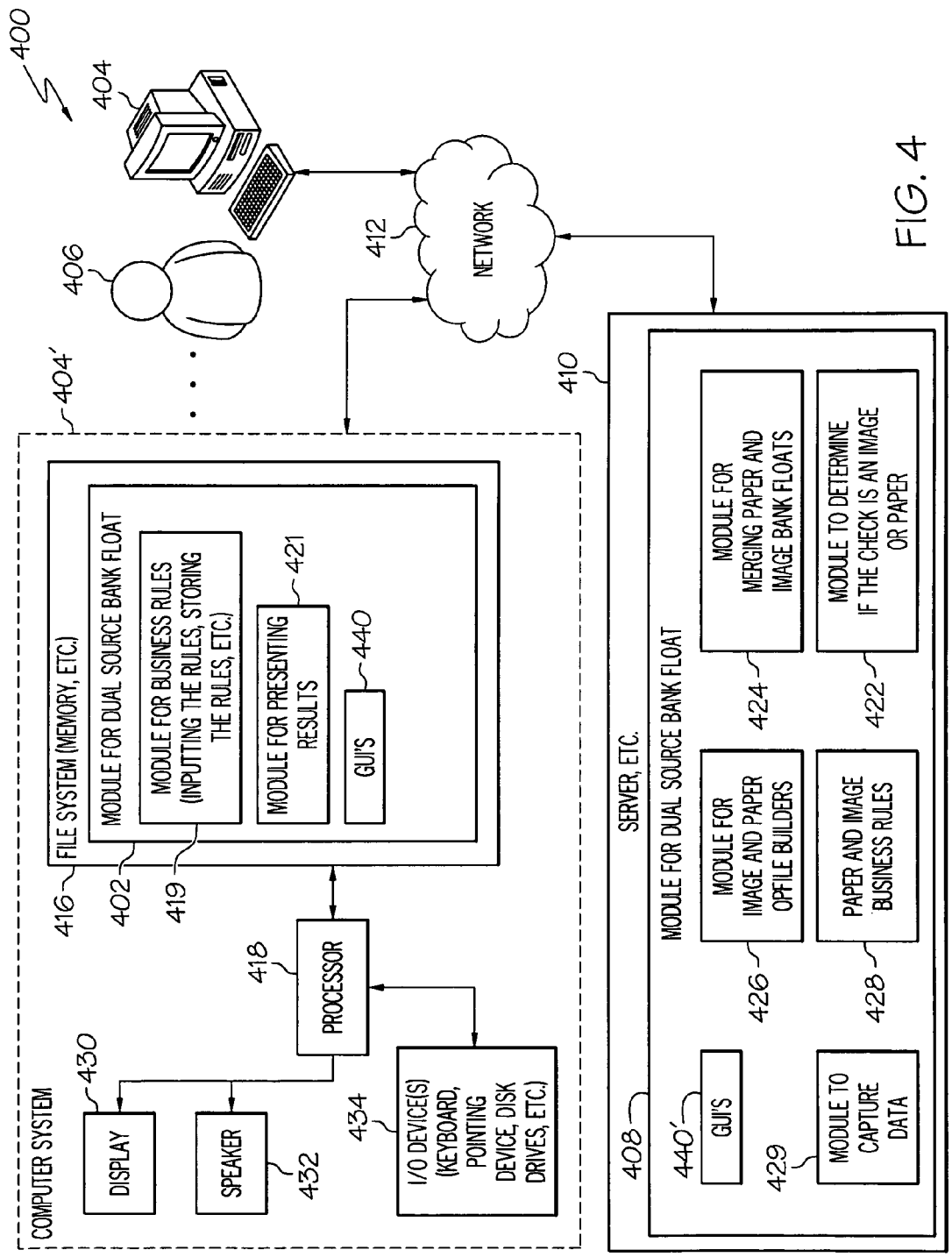
FIG. 4 is a block schematic diagram of an example of a system for dual source bank float in accordance with another embodiment of the present invention.

FIG. 4 is a block schematic diagram of an example of a system 400 for dual source bank float in accordance with another embodiment of the present invention. The system 400 includes a module for dual source bank float 402 operable on a computer system 404 or similar device of a user 406 or a client. Alternatively, in addition to the module for dual source bank float 402 on the user's computer system 404 or client, the system 400 includes a module for dual source bank float 408 operable on a server 410 and accessible by the user 406 or client 404 via a network 412. The methods 100, 200 and 300 are embodied or performed by the module for dual source bank float 402 or the server module for dual source bank float 408. For example, the methods 100, 200 and 300 may be performed by the module for dual source bank float 402. In another embodiment of the invention, the methods 100, 200 and 300 are performed by the server module for dual source bank float 408. In a further embodiment of the present invention, some of the features or functions of the methods 100, 200 and 300 are performed by the module for dual source bank float 402 on the user's computer system 404 and other features or functions of the methods 100, 200 and 300 are performed on the server module for dual source bank float 408.

The network 412 is the Internet, a private network or other network as previously mentioned. Each computer system 404' is similar to the exemplary computer system 404 and associated components as illustrated in FIG. 4.

The module for dual source bank float 402 and/or 408 may be a self contained system with imbedded logic, decision making, state based operations and other functions that may operate to perform a dual source bank float.

The module for dual source bank float 402 is stored on a file system 416 or memory of a computer system 404. The module for dual source bank float 402 may be accessed from the file system 416 and run on a processor 418 associated with the computer system 404.

The module for dual source bank float 402 includes a module for entry of business rules 419. The module for allowing entry of business rules 419 allows the user 406 to input various business rules such as the default RT processing, check cut thresholds, and the like as previously described with respect to FIGS. 1 and 2. The module for entry of business rules 419 is accessed or activated whenever the user 406 desires to input information and calls other module such as the graphical user interface 440 as described below. At this point, entry of business rules is received by the module for dual source bank float 408 on the server 410 via the network 412.

The module for dual source bank float 402 also includes a module for presenting results 421. This module 421 allows a user 406 to present results of the bank floats (e.g. total bank float amount for one day) and present such information to the user 406, such as by presenting the results to a display, storing the results in the file system 416, etc.

The module for dual source bank float 402 also includes a module for querying operation. This module 402 allows a user 406 to query any results of the bank float system and deliver such results to the module for presenting results 421.

The user's computer system 404 also includes a display 430 and a speaker 432 or speaker system. Any graphical user interfaces 440 associated with the module for dual source bank float 408 is presented on the display 430. Speaker 432 may present any voice or other auditory system signals or information to the user 406. The users computer system 404 also includes one or more input devices, output devices or combination input and output devices collectively I/O devices 434. The I/O devices 434 include a keyboard, computer pointing device or similar means to control input of information as described herein. The I/O devices 434 also include disk drives or devices for reading computer media including computer readable or computer operable instructions.

The server module for dual source bank float 408 includes a module to capture data 429. The module to capture data 429 relates to machines and software used to capture paper and/or image check data as well as to sort the paper checks, image checks, and/or any data captured.

The server module for dual source bank float 408 includes a module to determine if the check is an image or paper 422. The module to determine if the check is an image or paper 422 receives information from the module to capture data 429 and from this module 429, a determination is made as to whether the check is image or paper.

The server module for dual source bank float 408 also includes paper and image business rules 428. These paper and image business rules 428 are stored on the server and are used in determining the bank floats for both the paper checks and image checks.

The server module for dual source bank float 408 further includes a module for image and paper opfile builders 426. This module 426 takes data from the module to determine if the check is an image or paper 422, module to capture data 429, and the paper and image business rules 428 and creates either an image opfile or a paper opfile. As previously discussed, these opfiles are completely separate opfiles and are used to apply bank floats to either image checks or paper checks, respectively. The module for image and paper opfile builders 426 also assigns bank float to the image checks and the paper checks using the generates opfiles. As previously discussed with regard to FIGS. 1 and 2, the paper checks will be assigned a bank float from the paper opfile and the image checks will be assigned a bank float from the image opfile.

The server module for dual source bank float 408 also includes a module for merging paper and image bank floats 424. The module for merging paper and image bank floats 424 receives data from the mode for image and paper opfile builders 426 to merge the image check bank float with the paper check bank floats to create a single table having bank float.

The module for dual source bank float 402, 408 includes graphical user interfaces 440, 440', as previously mentioned. The module for dual source bank float 402, 408 allows one or more predetermined graphical user interfaces 440 to be presented to the user 406 in order for the user 406 to input data or information into the system 400. The graphical user interfaces 440 are predetermined and/or presented in response to the user 406 indicating the user 406 would like to perform a task associated with the dual source bank float system, such as initiate the dual source bank float, assign business rules, receive results, etc. The predetermined graphical user interfaces 440 are generated by the module for dual source bank float 402, 408 and are presented on the display 430 at the computer system 404. Graphical user interfaces 440 also include graphical user interfaces that permit the user 406 to view the result and query any of the databases and/or generate reports and/or standardize documents.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, functions repeated by the two blocks shown in succession may, in fact, be executed substantially concurrently, or the functions noted in the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention, unless the context clearly indicates otherwise. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein

What is claimed is:

1. A method for a dual source bank float, comprising:
    determining, by a financial institution, which of a plurality of checks deposited at the financial institution will be processed via a paper route and which of the plurality of checks will be processed via an image route;
    determining an image set of rules to be applied to the checks processed via the image route, wherein the image set of rules comprises an image operational float file generated by an image operational float file builder, wherein the image operational float file builder uses image sort pattern data and a first set of business rules are used to generate the image operational float file builder;
    processing at least one of the plurality of checks via the image route;
    determining a paper set of rules to be applied to the checks processed via the paper route, wherein the paper set of rules comprises a paper operational float file generated by a paper operational float file builder, wherein the paper operational float file builder uses paper sort pattern data and a second set of business rules are used to generate the image operational float file builder;
    processing at least one of the plurality of checks via the paper route;
    assigning, via a computing device processor, a bank float to the checks processed via the image route using the image set of rules;
    assigning, via a computing device processor, a bank float to the checks processed via the paper route using the paper set of rules; and
    merging the image bank float and the paper bank float into a single overall float.

2. The method of claim 1, wherein the second set of business rules are manually inputted.

3. The method of claim 1, wherein determining the paper set of rules occurs automatically.

4. The method of claim 1, further comprising reporting the overall float.

5. A computer program product for assigning bank float using a dual source, the computer program product including a computer-readable medium having a computer program residing thereon, wherein when executed the computer program product causes a computer operated by a financial institution to perform the method comprising:
    determining which of a plurality of checks deposited at the financial institution will be processed via a paper route and which of the plurality of checks will be processed via an image route;
    determining an image set of rules to be applied to the checks processed via the image route, wherein the image set of rules comprises an image operational float file generated by an image operational float file builder, wherein the image operational float file builder uses image sort pattern data and a first set of business rules are used to generate the image operational float file builder;
    processing at least one of the plurality of checks via the image route;
    determining a paper set of rules to be applied to the checks processed via the paper route, wherein the paper set of rules comprises a paper operational float file generated by a paper operational float file builder, wherein the paper operational float file builder uses paper sort pattern data and a second set of business rules are used to generate the image operational float file builder;
    processing at least one of the plurality of checks via the paper route;
    assigning a bank float to the checks processed via the image route using the image set of rules;
    assigning a bank float to the checks processed via the paper route using the paper set of rules; and
    merging the image bank float and the paper bank float into a single overall float.

6. The computer program product of claim 5, wherein the single overall float is used for reporting purposes.

7. A system comprising:
    a machine, operated by a financial institution, that receives a plurality of checks deposited at the financial institution, to be processed, the machine configured to determine which of the plurality of checks will be processed via a paper route and which of the plurality of checks will be processed via an image route; and
    a processing unit in communication with the machine, wherein said processing unit is configured to respond to computer instructions to:
        determine an image set of rules to be applied to the checks processed via the image route, wherein the image set of rules comprises an image operational float file generated by an image operational float file builder, wherein the image operational float file builder uses image sort pattern data and a first set of business rules are used to generate the image operational float file builder;
        process at least one of the plurality of checks via the image route;
        determine a paper set of rules to be applied to the checks processed via the paper route, wherein the paper set of rules comprises a paper operational float file generated by a paper operational float file builder, wherein the paper operational float file builder uses paper sort pattern data and a second set of business rules are used to generate the image operational float file builder;
        process at least one of the plurality of checks via the paper route;

assign a bank float to the checks processed via the image route using the image set of rules;
assign a bank float to the checks processed via the paper route using the paper set of rules; and
merge the image bank float and the paper bank float into a single overall float.

* * * * *